April 7, 1959   E. R. BERGMANN   2,880,852
BELT TENSION LIMITING DEVICE FOR BELT CONVEYORS
Filed July 3, 1957
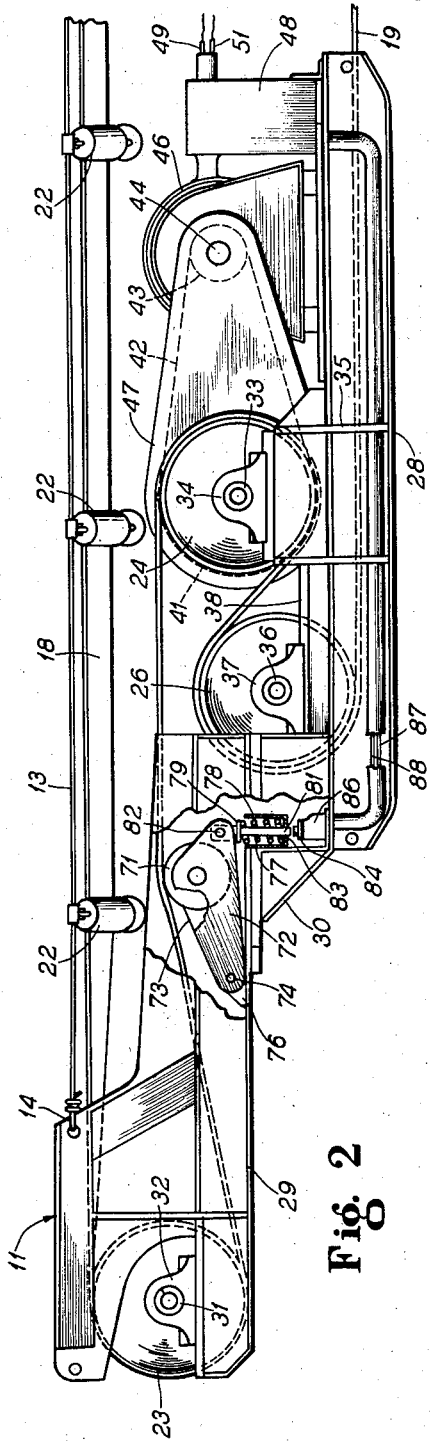
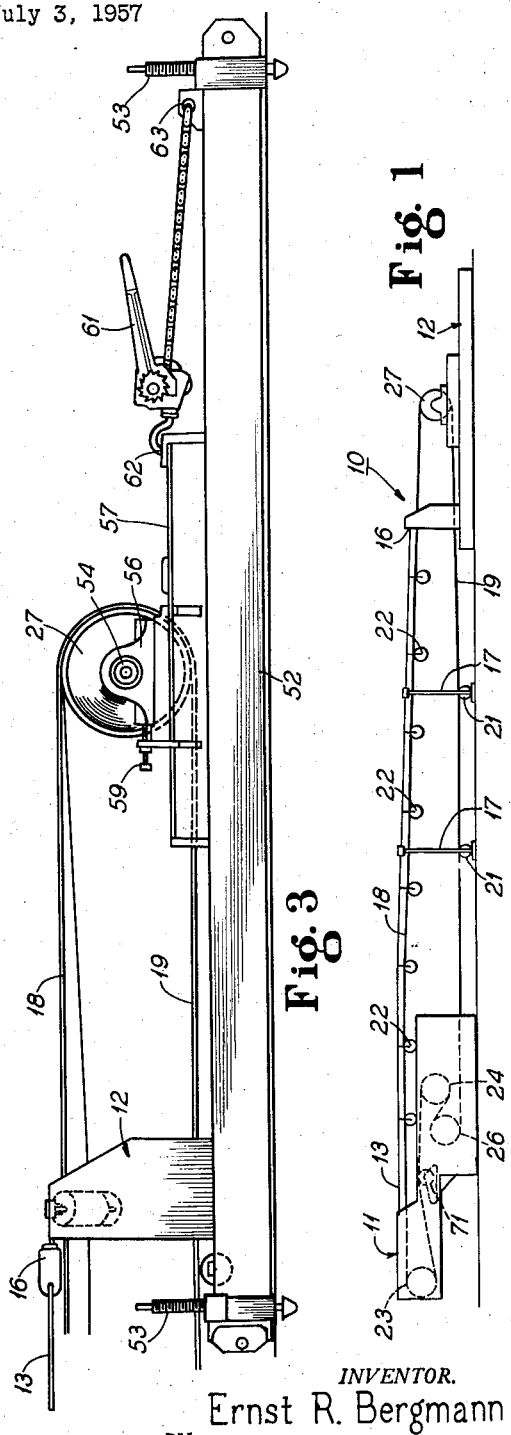
INVENTOR.
Ernst R. Bergmann
BY
Murray A. Gleeson
ATTORNEY United States Patent Office 2,880,852
Patented Apr. 7, 1959

2,880,852

BELT TENSION LIMITING DEVICE FOR BELT CONVEYORS

Ernst R. Bergmann, Evergreen Park, Ill., assignor to Goodman Manufacturing Company, Chicago, Ill., a corporation of Illinois Application July 3, 1957, Serial No. 669,874

1 Claim. (Cl. 198—232)

This invention relates generally to belt conveyors and more particularly to improvements in apparatus for limiting the tension on the conveyor belt.

As a general proposition, the power required to move any endless belt is a function of the product of the difference in tension of the two reaches on each side of the driving pulley and the velocity of the moving belt. It is possible, therefore, to increase greatly the tension in the two belt strands without materially affecting the power required to drive the belt. Sometimes operators have been known to increase the tension on the two belt reaches to the point where an inordinate load is placed on the bearings supporting the driving pulleys, such load being approximately the sum of the tension in the two reaches.

Structure according to the invention herein is particularly indicated for installations where the tension on the belt is maintained by adjusting the idler pulley at the material receiving end of the conveyor, and if the tension is adjusted by manual means without the usual tension limiting devices it is possible to create loads on the pulleys of the conveyor to an amount as will cause damage for the idler and driving pulleys.

According to the present invention the belt tension is sensed at a high tension point thereon and between a head pulley and snubbing and driving rollers for the belt. The sensing means includes a sensing roller in contact with the belt and movable with a relatively flat changing bight of the belt, the sensing roller moving against a spring and having a support contacting a switch which is operable when the bight is flattened beyond a predetermined amount.

With the foregoing considerations in mind it is a principal object of this invention to limit the tension of a conveyor belt to a value maintaining the bearing loads against the driving and idler pulleys below a predetermined value.

Other objects and important features of the invention will be apparent from a study of the specification following taken with the drawing which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and purview of the subjoined claims.

In the drawing:

Fig. 1 is an elevational view of an endless belt conveyor having improvements according to the present invention embodied therein;

Fig. 2 is a detailed elevational view of the head or discharge section of such conveyor; and Fig. 3 is a detailed elevational view of the tail or material receiving section of such conveyor.

Referring now to the drawing, the improved conveyor according to the present invention is referred to generally by the reference numeral 10 and includes a head or discharge section 11 and a tail or material receiving section 12. The conveyor 10 may be of the type as disclosed in Craggs et al. Patent No. 2,773,257, issued December 4, 1956, for Conveyor Having Flexible Strand Side Frames and Troughing Roller Assembly Therefor, and comprising a pair of laterally spaced support cables 13 anchored at 14 to the head section 11, and at 16 to the tail section 12, the cables 13 being supported throughout their length upon standards 17.

An endless conveyor belt seen in Fig. 1 has a conveying reach 18 and a return reach 19, the latter being guided upon idler pulleys 21 supported at the standards 17. The load on the conveying reach 18 is transmitted into the cables 13 by means of troughing assemblies 22 extending between the spaced strands 13.

The endless belt is trained for orbital movement between the head section 11 and the tail section 12 and is reversed in direction about an idler pulley 23 at the head section and driven about a drive roller 24 and snubbed about a snubbing roller 26 to increase the wrap around driving roller 24, the endless belt being also reversed in direction about an idler pulley 27 at the tail section 12.

As seen in Fig. 2, the head section 11 includes a base frame 28 and a framework 29 extending from a pedestal 30 mounted upon the base frame 28. The idler pulley 23 turns on a shaft 31 having a bearing support 32 resting upon the frame 29.

Driving pulley 24 is supported upon a shaft 33 supported at its ends in a bearing 34 resting upon a support 35 extending upward from the base frame 28. The snubbing roller 26 likewise has a shaft 36 mounted at its ends in a bearing 37 resting upon a mounting 38 extending between the base frames 28.

The driving pulley 24 is fast to a sprocket 41 meshing with a driving sprocket chain 42 trained about a driving sprocket 43 fast upon a shaft 44 of a driving motor 46. As seen in Fig. 2, the driving sprocket chain 42 is housed within a chain guide 47. The motor 46 has a control housing 48 therefor, power being supplied to the control housing by means of leads 49 and 51.

Referring now to Fig. 3, the tail section 12 consists of a base frame 52 which can be leveled by screw members 53 at each corner thereof. The idler pulley 27 turns on a shaft 54 supported at each end in a bearing support 56 in turn resting upon a platform 57 supported by the base frame 52 and slidable with respect thereto. The position of the bearing support 56 with respect to the platforms 57 can be adjusted by means of a screw adjustment 59.

Tension in both reaches of the belt can be adjusted by means of a chain "come-along" indicated generally by the reference numeral 61 and anchored at 62 to the movable platform 57 and at 63 to the base frame 52.

For underground installations, both the head section 11 and the tail section 12 can be held by jacks, not shown, bearing against the mine roof. In above ground installations both the head and tail sections can be held in position by means of cables anchored to suitable abutments or by other anchorage means to the ground.

In the conveyor thus far described it is possible to adjust the tension on the conveying and return reaches 18 and 19 to a value which would impose a large load upon the bearings supporting both the idler and drive pulleys for the belt, such load upon the bearings being twice the belt tension. According to the present invention the sensing of the belt tension is done at a point where it has its largest value, and in the embodiment of the invention herein, the measurement of the belt tension is done between the idler reversing pulley 23 and the driving pulley 24, where the belt tension is at its highest value.

In order to measure the tension in the belt a sensing pulley 71 is mounted between a pair of laterally spaced arms 72 and 73, see Fig. 2. Each arm is pivoted at 74 to a bracket 76 mounted on the frame 29. The sensing roller 71 is urged into contact with the lower side of the belt by means of a coil spring 77 bottomed in a cup 78 supported by the pedestal 30. Spring 77 is bottomed at its other end against a flange 79 of a guide rod 81 pivoted at 82 to the free end of the arm 72. The guide rod 81 extends through an opening 83 in the cup 78, the lower end thereof at times bearing against a switch actuator 84 of a switch 86.

The switch 86 is connected by a pair of control leads 87 and 88 to the control housing 48. The position of the sensing roller 71 and its urgence against the underside of the reach of the belt between the idler return pulley 23 and the driving pulley 24 is such as to provide a bight of the belt therebetween, albeit such bight is quite flat. As the tension in the belt between the pulleys 23 and 24 increases in excess of a predetermined amount, the bight of the belt at the sensing roller 71 will tend to flatten to urge the rod 81 against the switch actuator 84 to open the control circuit to the drive motor 46.

Upon the occurrence of such an event the operator is apprised of the fact that the tension in the reaches 18 and 19 is in excess of a desired value, and of a value as to impose too large a load on bearing supports for the pulleys of the conveyor. The operator then needs merely to release the "come-along" in successive steps so that the movable support 57 will take a position corresponding to a lessened tension in the conveyor belt. At such time, the urgence of the spring 77 will lift the sensing roller 71 and the guide rod 81 out of contact with the switch actuator 74, once more to close the circuit to the drive motor 46. At such latter time, the load against the bearings will be maintained at a proper value.

While the invention has been described in terms of a preferred embodiment, its scope is intended to be limited only by the claim here appended.

I claim as my invention:

In a belt conveyor, spaced frame means defining material receiving and discharge portions of said conveyor, each of said frame means supporting an idler roller, an endless conveyor belt orbitally movable therebetween in load carrying and return reaches, means for moving the idler roller at the material receiving end of said conveyor in a direction to apply a load supporting tension to said belt, driving means disposed at the other of said frame means in the return reach of said endless belt comprising a driving pulley and a snubbing pulley, a driving motor for said driving pulley, and control means for said driving motor effective to deenergize said driving motor when the tension in said belt is above a predetermined maximum comprising a sensing roller contacting said return reach between the idler roller at the frame means of said discharge portion and said driving pulley, and operable for movement in a relatively flat bight of the return reach therebetween, a spring urging said sensing roller against said flat bight, and a switch operable by movement of said sensing roller when said bight flattens by increase in belt tension.

References Cited in the file of this patent

UNITED STATES PATENTS

| | | |
|---|---|---|
| 1,728,283 | Fisher | Sept. 17, 1929 |
| 2,392,150 | Hornbostel et al. | Jan. 1, 1946 |